United States Patent Office 3,102,810
Patented Sept. 3, 1963

3,102,810
PRINT-OUT CYANINE AND STYRYL DYE BASES AND PROCESS OF PRODUCING LITHO MASTERS AND THE LIKE THEREWITH
Robert H. Sprague, Chagrin Falls, Harry L. Fichter, Jr., Lakewood, and William P. Hamilton, Cleveland, Ohio, assignors to Horizons Incorporated, a corporation of New Jersey
No Drawing. Filed Apr. 5, 1961, Ser. No. 100,948
15 Claims. (Cl. 96—33)

This invention relates to a non-silver direct print-out photographic system, sensitive to visible light, requiring no development and of sufficient speed to permit the use of a camera for the taking of pictures.

The panchromatic photosystem of this invention is characterized by an enhanced speed due to a synergistic effect obtained by the use of combination of either (1) styryl bases or cyanine dye bases or combinations of these in combination with (2) leuco bases or carbinol bases of triphenylmethane or diphenylmethane dyes, in photosystems including organic halides represented by the generalized formula A—C—X$_3$ wherein A is a monovalent radical selected from the group consisting of H, Cl, Br, I, alkyl (both substituted and unsubstituted) and aryl (both substituted and unsubstituted), and each X is a halogen selected from the group consisting of Cl, Br and I, which generate free radicals on exposure to radiation of a suitable wavelength.

Preferably the photosystem also includes a suitable base material in which the light-sensitive material and the combination of synergistically acting agents are dispersed or on which they may be supported in the form of a thin film or coating.

As indicated above, in its simplest form the photosensitive system of this invention comprises the following:

(a) An organic halogen compound,
(b) One or more styryl dye bases, one or more cyanine dye bases or mixtures of the above,
(c) One or more leuco bases or carbinol bases of a triphenylmethane or diphenylmethane dye, and
(d) A carrier which supports (a), (b) and (c) either as a dispersion throughout the carrier or as an intimate admixture coated on a surface of the carrier material.

Each of the components of this photosensitive system and the manner in which the photosensitive system is utilized will now be considered in greater detail.

(a) ORGANIC HALOGEN COMPOUND

The organic halogen compounds suitable in the photosystem of the present invention are those which release halogen free-radicals when exposed to a proper dose of radiant energy and which may be represented by the generalized formula A—C—Br$_3$ wherein A is a monovalent radical selected from the group consisting of H, Cl, Br, I, unsubstituted alkyl, substituted alkyl, unsubstituted aryl and substituted aryl.

Organic compounds which have been found suitable for the process include the following compounds:

CBr$_4$ (carbon tetrabromide)
HCBr$_3$ (bromoform)
C$_2$Br$_6$ (hexabromoethane)
C$_6$H$_5$CBr$_3$ (benzotribromide)
C$_2$HBr$_5$ (pentabromoethane)

Each of the above compounds yields a halogen free-radical when the bond joining a halogen atom to a polyhalogenated carbon atom is ruptured upon exposure to light. The presently preferred compound for this invention is carbon tetrabromide, which is readily available commercially in the requisite purity.

(b) DYE BASE (1) *Styryl Base*

The first of the several families of dye bases or dye progenitors, which constitutes one of the synergists in the present photosystem, comprises the styryl dye bases and their higher vinylene homologs, such as those described in our application Serial No. 42,233, filed July 12, 1960 issued as United States Patent 3,095,303 on June 25, 1963. As described in that application, the variety of the colored styryl-base type compounds and their vinylene homologs is sufficiently broad to blanket the visible range with respect to their light-absorption qualities and also with respect to the nature of the color which can be produced as the result of exposure to light when utilized in combination with organic halogen compounds of the type described above.

In view of the broad variety of dye bases available from the class indicated, it is possible in the present photosystem to expose a blue-sensitive variety to blue light to yield an intense yellow color, a green-sensitive variety to green light to produce a magenta color, a red-sensitive variety to red light to produce a cyan color, etc. The color of the developed image is thus complementary to the color of the exposing light, which is a necessary characteristic of a color negative material. The sharp cutting absorption, both of the progenitor and the color form produced as the result of exposure to light, is such that increments of absorption throughout the visible may be produced as desired for specialized effects.

While we do not wish to be bound to any specific theory as to the reason for the ability to blanket the visible with respect to sensitivity and development of color, it appears that, either as a result of exposure to light or possibly simply as the result of mixture of the organic halogen-containing compound and the weakly colored dye, a complex is formed which requires less energy to raise it to an excited state to permit the desired photolytic reaction to take place than when such complexes do no form.

It has been pointed out that the dye progenitor is weakly colored and, as a result of exposure to light in the presence of the organic halogen compound, a brilliant, intense, sharp cutting color is obtained. Equally important as the foregoing is our finding that, as a result of exposure to light with-or-without subsequent development by heat, a sharp difference in solubility in certain solvents exists between unexposed and exposed areas. This finding is of exceptional importance in order to eliminate any residual color which may exist from the progenitor itself and which might mask the desired print-out effects. More important than the elimination of such color-masking effects is the fact that such differences in solubility may be utilized for fixing and stabilization of the printed image. Equally important is our finding that, as a result of such solvent extraction, hydrophilic-hydrophobic differentiation is available, depending on whether or not the areas have been exposed to light. Thus, it appears that the developed-out dye image is ionic in character, exhibits hydrophilic properties, and tends to be insoluble in non-polar solvents; whereas the unexposed dye progenitor, even in the presence of the organic halogen-containing compound, is a covalent non-ionic compound, soluble in a variety of organic solvents, and tends to be hydrophobic in character. Such hydrophobic properties may be enhanced by placing the photosystem on a hydrophobic base. As a consequence, the system can be utilized as a foundation of photoetch processes and as a means for producing a lithographic plate.

The present invention comprises an improvement over that described in the aforesaid application, constituting the addition of a leuco base or carbinol base of a tri- or diphenylmethane dye, whereby a greatly enhanced sensitivity is obtained.

Suitable styryl dye bases include two general types. The first is the styryl base type obtained through the medium of aldehyde condensation reactions on heterocyclic bases containing an active methyl group, such condensation reactions being known to those skilled in the art. The types of heterocyclic bases useful in such reactions include the following:

2-methylbenzothiazole
2-methylbenzimidazole
2-methylbenzoxazole
2-methylthiazoline
2-methylbenzoselenazole
2-methyl-4-phenyloxazole
2,3,3-trimethylindolenine
Alpha-picoline
Gamma-picoline
Quinaldine
Lepidine
1-methylisoquinoline
3-methylisoquinoline
2-methyl-α-naphthothiazole
2-methyl-β-naphthothiazole
2,4-dimethylthiazole
2-methyl-4-phenylthiazole
2-methylthiazole
2-methylthiopyranothiazole
2-benzothiazolylacetonitrile
2-quinolylacetonitrile
4-quinolylacetonitrile The second type of styryl dye bases may be regarded as higher vinylene homologs of the styryl bases and may be obtained through the medium of condensation of the heterocyclic bases such as those listed above with cinnamal types of compounds, again as known to those skilled in the art of the development of such color bases.

The styryl dye bases useful in the practice of this invention may be represented by the following general formula:

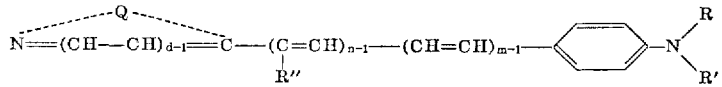

wherein R and R' represent monovalent radicals selected from the group consisting of lower alkyl (i.e., methyl, ethyl, n-propyl) and benzyl, and may be the same as one another or different from one another; R" represents a monovalent radical selected from the group consisting of H and —CN; $d$ and $n$ each represents a positive integer which is either 1 or 2; $m$ is a positive integer not greater than 4; and the sum of $n-1$ and $m-1$ is not greater than 4; and Q represents the nonmetallic atoms necessary to complete a heterocyclic nucleus (i.e., the atoms of C, O, S, Se, and N) necessary to complete heterocyclic compounds such as those listed above.

(2) Cyanine Base

The second of the several families of dye bases or dye progenitors, which constitutes one of the synergists in the present photosensitive system, comprises the cyanine dye bases such as those described in our pending application, Serial No. 95,031, filed March 13, 1961.

The cyanine dye bases useful for the purposes of our invention are the several types, including those used commercially as "supersensitizers" in conventional silver halide photography. Although not themselves strong sensitizers, such bases impart increased sensitizing action to cyanine dyes when such combinations are employed in silver halide emulsions. In general cyanine dye bases are known corresponding to all the different classes of cyanine dyes, including symmetrical and unsymmetrical monomethine cyanines, carbocyanines, dicarbocyanines, tricarbocyanines, hemicyanines, pyrrolocyanines and azacyanines. The cyanine dye bases may be regarded as dequaternized cyanine dyes as illustrated below for diethylthiacarbocyanin (I) and the base (II) derived from it.

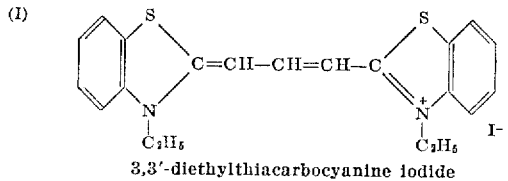

3,3'-diethylthiacarbocyanine iodide

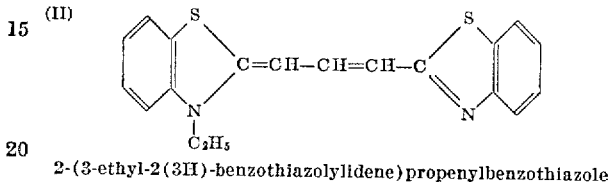

2-(3-ethyl-2(3H)-benzothiazolylidene)propenylbenzothiazole

Alternatively, cyanine dye bases are derived from heterocyclic bases by a wide variety of reactions well-known to those skilled in the art. Typical heterocylic bases useful in such reactions are the following:

2-methylbenzothiazole
2-methylbenzoxazole
2-methylbenzimidazole
2-methylthiazoline
Quinaldine
Lepidine
1-methylisoquinoline
2-methyl-α-naphthothiazole
2-methyl-β-naphthothiazole
Alpha-picoline
Gamma-picoline
3-methylisoquinoline
2,4-dimethylthiazole
2-methyl-4-phenylthiazole
2-methylthiazole
2,3,3-trimethylindolenine
2,4-dimethylselenazole
2-methylbenzoselenazole
2,4-dimethyloxazole
2-methyl-α-naphthoxazole
2-methyl-β-naphthoxazole
2-methyl-4,5,6,7-tetrahydrobenzothiazole
2-methyl-4,5,6,7-tetrahydrobenzoxazole
2-methyl-5,6,7,8-tetrahydro-4-cycloheptathiazole
2-methyl-5,6-dihydro-4-cyclopentathiazole
2-methyl-6,7-dihydro-4-H-pyrano(4,3D)thiazole
2-methyl-6,7-dihydro-4-H-thiopyrano(4,3D)thiazole
2-methyl-5,6-dihydro-4-H-pyrano(3,2D)thiazole
2-cyanomethylquinoline
2-cyanomethylbenzothiazole
4-cyanomethylquinoline
2-cyanomethylbenzimidazole
2-cyanomethylpyridine
4-cyanomethylpyridine Cyanine bases useful in our novel photo process are characterized by the following general formulas:

(I) 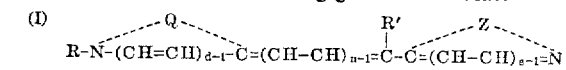

wherein $d$ and $e$ each represents a positive integer of from 1 to 2; $n$ represents a positive integer of from 1 to 4; R represents an organic radical selected from the group consisting of alkyl, aralkyl and aryl groups; R' represents hydrogen or a cyano group; and Q and Z each represents the nonmetallic atoms necessary to complete a heterocyclic organic nucleus containing from 5 to 6 atoms in the ring.

Cyanine dye bases characterized by the above general formula may be symmetrical or unsymmetrical, of varying chain lengths; and they may have substituents on the rings or on the chain. Examples of several types are depicted below:

(1) *Symmetrical Compounds*

(A)
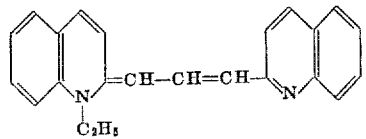
2-[3-(1-ethyl-2(1H)-quinolylidene)propenyl]quinoline (B)
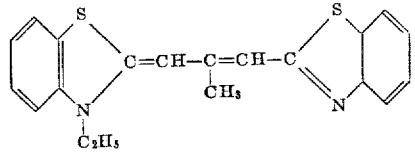
2-[2-methyl-3-(3-ethyl-2(3H)-benzothiazolylidene)propenyl]benzothiazole (C)
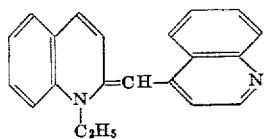
4-[(1-ethyl-2(1H)-quinolylidene)methyl]quinoline (D)
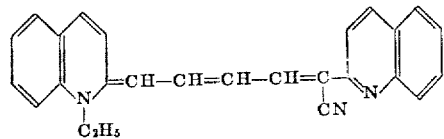
2-[1-cyano-5-(1-ethyl-2(1H)-quinolylidene)-1,3-pentadienyl]quinoline (E)
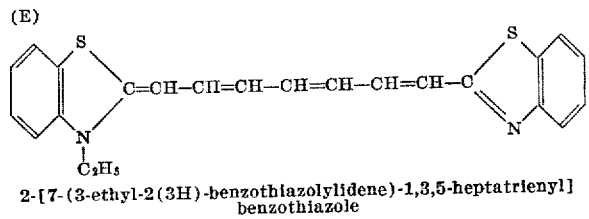
2-[7-(3-ethyl-2(3H)-benzothiazolylidene)-1,3,5-heptatrienyl]benzothiazole (2) *Unsymmetrical Bases*

(A)
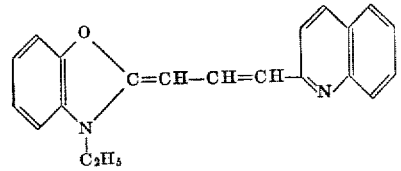
2-[3-(3-ethyl-2(3H)-benzoxazolylidene)propenyl]quinoline (B)
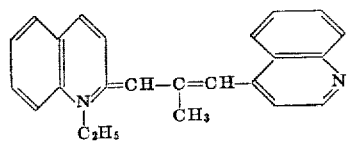
4-[2-methyl-3-(1-ethyl-2(1H)-quinolylidene)propenyl]quinoline (C)
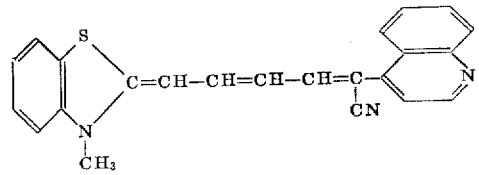
4-[1-cyano-5-(3-methyl-2(3H)-benzothiazolylidene)-1,3-pentadienyl]quinoline (D)
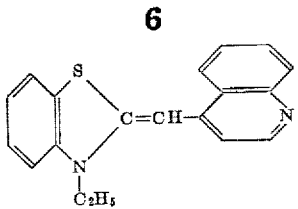
4-[(3-ethyl-2(3H)-benzothiazolylidene)methyl]quinoline Azacyanine bases useful in our photoprocess may be regarded as related to the cyanine dye bases by replacement by nitrogen of one or more methine groups in the chain joining the two heterocyclic nuclei. They may be characterized by the following general formula:

(II)
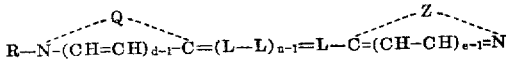
$$R-N-(CH=CH)_{d-1}-C=(L-L)_{n-1}=L-C=(CH-CH)_{e-1}=N$$

wherein $d$, $e$, $n$, R, Q and Z each has the same meaning as in general Formula I above, and L represents a member selected from the group consisting of CH and N and may be the same or different, at least one L being a nitrogen atom.

Typical azacyanine bases are listed below:

(A)
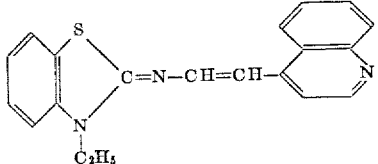
4-[2-(3-ethyl-2(3H)-benzothiazolylideneamino)vinyl]quinoline (B)
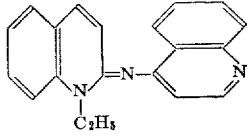
4-(1-ethyl-2(1H)-quinolylideneamino)quinoline (C)
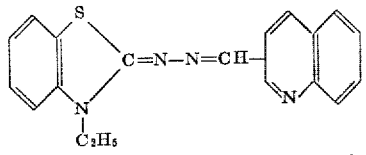
(3-ethyl-2(3H)-benzothiazolylidene)-(2-quinolylmethylene)hydrazine (D)
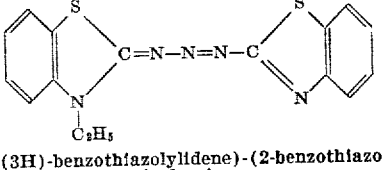
(3-ethyl-2(3H)-benzothiazolylidene)-(2-benzothiazolylimino)hydrazine (E)
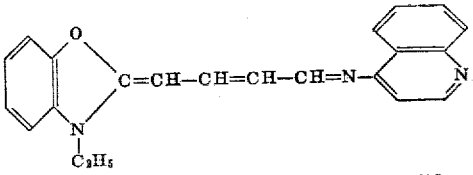
4-[(3-ethyl-2(3H)-benzoxazolylidene)-2-butenylidene]aminoquinoline (F)
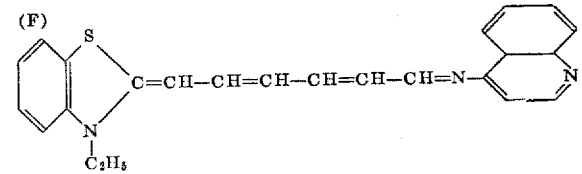
4-[6-(3-ethyl-2(3H)-benzothiazolylidene)-2,4-hexadienylidene]aminoquinoline A further class of bases useful in our photoprocess are those containing nitrogen in the chain, related to the styryl dye bases and their vinylene homologs, and corresponding to the following general formula:

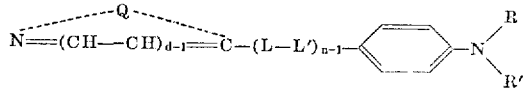

wherein R and R' represent alkyl or benzyl and may be the same or different from one another, $d$ represents either 1 or 2, $n$ represents a positive integer from 1 to 4, L and L' each represents a member selected from the group consisting of CH and N and may be the same or different, at least one of L and L' being a nitrogen atom, and Q represents the nonmetallic atoms necessary to complete a heterocyclic nucleus.

Bases typical of this class include the following:

(A)

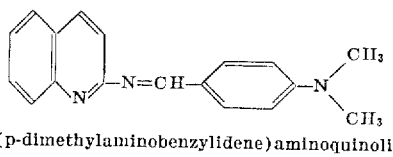

2-(p-dimethylaminobenzylidene)aminoquinoline (B)

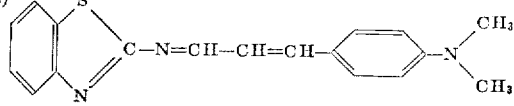

2-[(3-p-dimethylaminophenyl)-2-propenylidene]aminobenzothiazole (C)

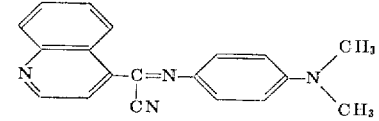

4-(p-dimethylaminophenylimino)cyanomethylquinoline (D)

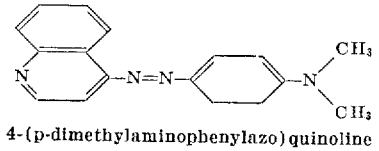

4-(p-dimethylaminophenylazo)quinoline (E)

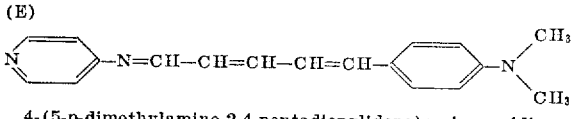

4-(5-p-dimethylamino-2,4-pentadienylidene)aminopyridine

In the same manner as that in which the present invention comprises an improvement over Serial No. 42,233, filed July 12, 1960, it comprises an improvement over Serial No. 95,031, filed March 13, 1961; that is, it provides a photosystem of greatly enhanced sensitivity by the addition of a leuco base or a carbinol base of a triphenylmethane dye or a diphenylmethane dye to the photosensitive compositions described in our earlier filed application.

(c) LEUCO BASES OR CARBINOL BASES OF TRIPHENYLMETHANE DYES OR DIPHENYLMETHANE DYES

As compared with our earlier filed, above-noted applications, the present photosystem achieves a vastly improved sensitivity by virtue of the inclusion therein of a leuco base or a carbinol base of a triphenylmethane dye or of a diphenylmethane dye.

Suitable leuco bases or carbinol bases may be presented by one or the other of the following generalized formulae:

A. Leuco or carbinol base of triphenylmethane dye

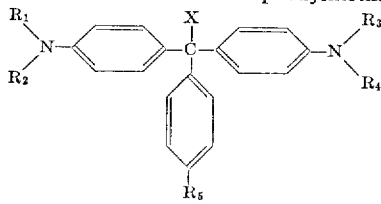

wherein $R_1$, $R_2$, $R_3$, and $R_4$ are each selected from the group consisting of H, alkyl, aralkyl and aryl groups and they may be the same or different, and $R_5$ represents a monovalent radical selected from the group consisting of —H and

where $R_1$ and $R_2$ have the same meaning as before and X is H for the leuco base and OH for the carbinol base.

B. Leuco or carbinol base of diphenylmethane dye

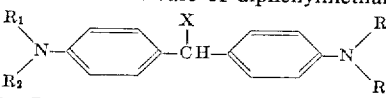

wherein $R_1$, $R_2$, $R_3$, and $R_4$ have the same meaning as in the immediately preceding formula (A, above) and X is again —H for the leuco base and —OH for the carbinol base.

(d) CARRIER

A preferred method of formulating the photosensitive composition is to prepare a solution of a film-forming plastic such as nitrocellulose in a solvent for the plastic, and to add the organic halogen compound (a) and the two synergists (b) and (c) above to the solution. Cellulose derivatives such as ethyl cellulose, methyl cellulose, carboxymethyl cellulose; synthetic polymers such as polyvinyl chloride, polyvinylidene chloride (Saran), polyvinyl acetate; or any of a host of other carriers such as those specified in our earlier applications may be used.

(e) PROPORTIONS

In general, in the photosystems of the present invention, the principal constituent in the composition is the organic halogen compound. For each 1,000 parts by weight of the latter, approximately from 1 to 100 parts by weight of each of the synergists has been found to produce particularly effective results, with about 2 parts by weight of each yielding optimum increase in sensitivity.

To further illustrate the nature of the improvements obtainable with the photosystem of the present invention, as compared with photosystems from which the synergistic combination was absent, the following table reports sensitivity for compositions consisting of 100 mg. of the dye bases listed below, mixed with 2.8 grams of $CBr_4$ and dissolved in 16 ml. of 10% nitrocellulose in acetone.

TABLE 1

| Wavelength (A.) | Time in Seconds | | | | | | |
|---|---|---|---|---|---|---|---|
|  | I | II | III | IV | V | I and IV | III + LCV |
| 3,900 | 250 | 70 | 30 | 65 | 30 | 35 | 5 |
| 4,100 | 255 | 75 | 30 | 65 | 25 | 35 | 5 |
| 4,300 | 240 | 70 | 25 | 65 | 25 | 35 | 3 |
| 4,500 | 220 | 60 | 30 | 35 | 20 | 35 | 3 |
| 4,700 | 225 | 45 | 30 | 30 | 15 | 30 | 3 |
| 4,900 | 360 | 45 | 40 | 40 | 15 | 30 | 3 |
| 5,100 | 360 | 90 | 95 | 80 | 25 | 55 | 5 |
| 5,300 | ----- | 150 | 150 | 190 | 45 | 120 | 7 |
| 5,500 | ----- | 180 | 300 | 380 | 60 | 180 | 11 |
| 5,700 | ----- | 180 | ----- | ----- | 75 | ----- | 15 |
| 5,900 | ----- | 200 | ----- | ----- | 90 | ----- | 16 |
| 6,100 | ----- | 480+ | ----- | ----- | 240 | ----- | 19 |
|  | ----- | ----- | ----- | ----- | ----- | ----- | 30 |

The data for the synergistic combination of dye III and leuco-Crystal Violet are presented graphically as follows.

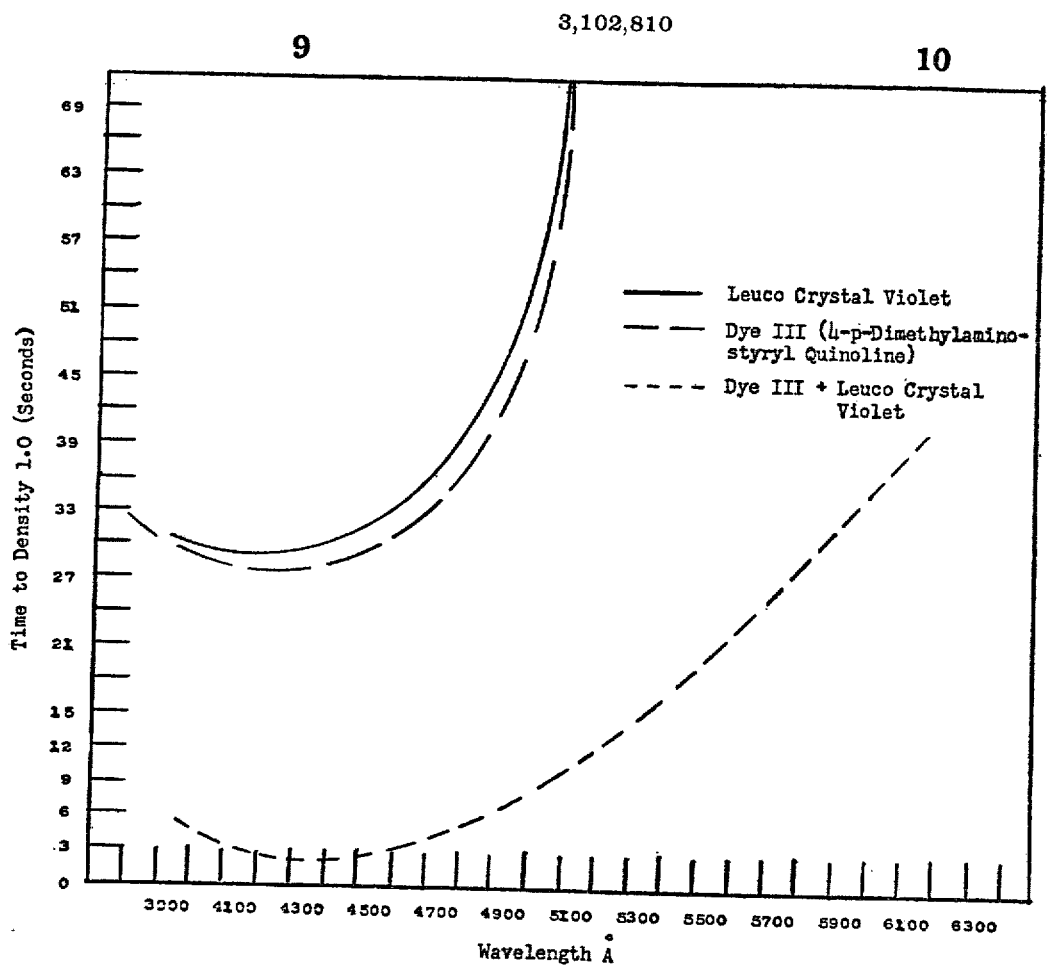

The solutions were coated on plastic film and exposed on a Bausch and Lomb monochromator at various wavelengths, using a slit width of 5 millimeters and an exposure time sufficient to give a reflection density of 1.

(I) 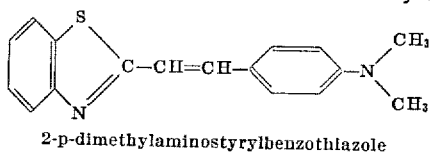
2-p-dimethylaminostyrylbenzothiazole (II) 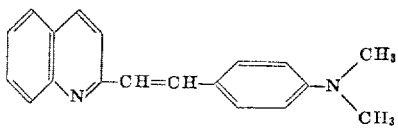
2-p-dimethylaminostyrylquinoline (III) 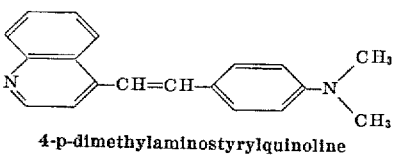
4-p-dimethylaminostyrylquinoline (IV) 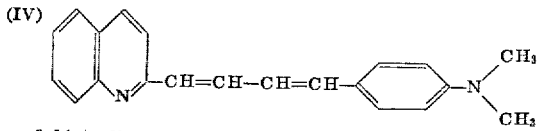
2-[4-(p-dimethylaminophenyl)-1,3-butadienyl]quinoline (V) 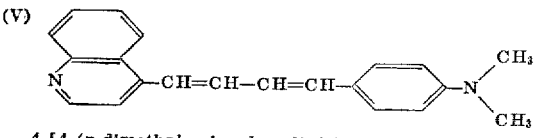
4-[4-(p-dimethylaminophenyl)-1,3-butadienyl]quinoline LCV.—Leuco-Crystal Violet:

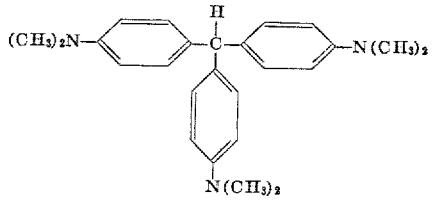

The examples which follow will serve to further illustrate the sensitivity obtained with compositions containing suitable amounts of leuco bases or carbinol bases of triphenylmethane dyes and diphenylmethane dyes.

EXAMPLE 1

When 50 milligrams of the styryl base, 4-p-dimethylaminostyrylquinoline, and 50 mg. of the leuco base of crystal violet were dissolved in 16 cc. of ethyl acetate containing 2.8 g. carbon tetrabromide, then coated on a clear or pigmented cellulose acetate substrate, excellent negative print-out images were obtained on exposure in a camera for thirty seconds at F4.5 in bright sunlight. The direct print image could be fixed by bathing in a solvent solution consisting of three parts ethyl acetate and seventeen parts benzene (3:17) to remove the unreacted starting materials.

EXAMPLE 2

Fifty milligrams of the styryl base, 4-p-dimethylaminostyrylquinoline, and 50 mg. of Michler's hydrol were dissolved in a solution of 1.0% nitrocellulose in acetone containing 2.8 g. carbon tetrabromide. The mix was coated on clear cellulose acetate and exposed through a negative to a General Electric sunlamp. Excellent print-out images were obtained on five and ten second exposures. When exposed in a camera at F4.5 in bright sunlight for six minutes, an excellent negative print-out image was produced. The images were fixed in the manner related in Example 1.

EXAMPLE 3

Fifty milligrams of the styryl base, 2-p-dimethylaminostyrylquinoline, and 50 mg. of Michler's hydrol were dissolved in 16 cc. ethyl acetate containing 1.4 g. of carbon tetrabromide and coated on clear cellulose acetate. The resulting photographic system gave excellent print-out images when exposed through a negative to a General Electric sunlamp for twenty seconds. The same mix with the styryl base omitted required twice that exposure for the same image density, and with the Michler's hydrol omitted required sixty to seventy seconds exposure for the same image density. The image was fixed in the manner related in Example 1.

EXAMPLE 4

Fifty to 300 milligrams of the leuco base of Methyl Violet were added to 16 cc. of ethyl acetate containing 2.8 g. carbon tetrabromide and 50 mg. of 4-p-dimethylaminostyrylquinoline. The mixes were coated on cellulose acetate, and excellent images were seen on 0.5-second exposure through a negative to a sunlamp. The same mixture with the leuco base omitted required four seconds for an image of equal density, and with the 4-p-dimethylaminostyrylquinoline omitted required two to four seconds for an image of comparable density. The images were fixed as in Example 1.

EXAMPLE 5

Fifty to 100 milligrams of the leuco base of Malachite Green and 25 to 50 mg. of 4-p-dimethylaminostyrylquinoline were mixed in 16 cc. ethyl acetate containing 2.8 g. of carbon tetrabromide and coated on cellulose acetate. Excellent print-out images were obtained on one and two second exposures to a sunlamp through a negative. With leuco Malachite Green alone in the mix five to ten seconds exposure was required for comparable images, and with only the 4-p-dimethylaminostyrylquinoline in the CBr$_4$ mixture, four seconds was required for images of a like density. The images were fixed in the manner related in Example 1. When exposed in a camera in bright sunlight at F4.5, good density negative print-out images were produced.

EXAMPLE 6

Fifty milligrams of the leuco base of Opal Blue Dye (C.I. 42,760) and 50 mg. of 4-p-dimethylaminostyrylquinoline were dissolved in 16 cc. ethyl acetate containing 2.8 g. carbon tetrabromide. Good images were formed on 0.5 to 4-second exposure to a sunlamp through a negative. The leuco base of Opal Blue alone required four minutes to give a reflection density of 1.0 when exposed on a monochromator at 3900 A. and 4100 A., while in combination with 4-p-dimethylaminostyrylquinoline only ten seconds exposure at these wavelengths was required to give the same density. The 4-p-dimethylaminostyrylquinoline alone in the above mix required a thirty-second exposure to give density 1.0 at 3900 A. and 4100 A. Throughout the spectral range of 3900 A. to 4900 A. the presence of leuco Opal Blue in combination with the styryl base gave a reflection density of 1.0 twenty to thirty seconds faster than the same mix without leuco Opal Blue. Fixing was achieved in the manner described in Example 1.

Films of this composition exhibited photosensitivity between 3900 A. and 5700 A. as measured on a Bausch and Lomb 250-millimeter grating monochromator.

EXAMPLE 7

Twelve and one-half milligrams of 4,4'-methylene-bis (N,N-dimethylaniline) and 12.5 mg. of 4-p-dimethylaminostyrylquinoline were dissolved in 8 cc. of ethyl acetate containing 1.4 g. carbon tetrabromide and coated on clear transparent cellulose acetate sheets. When exposed to a photoflood lamp, this coating produced densities much higher than either of the individual components of the mix for the same unit of exposure, and, when the densities of the individual components were superimposed one on the other, the combined density was less than half that produced when both components were present in the same mix.

EXAMPLE 8

Twelve and one-half milligrams of 2-[4-(p-dimethylaminophenyl)-1,3-butadienyl]quinoline were added to 16 cc. of 1% ethyl cellulose in toluene containing 12.5 mg. of the carbinol base of the dye, Opal Blue SS (C.I. 42,760). To this mix was added 2.8 grams of carbon tetrabromide, and the mixture was coated on polyvinyl chloride sheets. When exposed on a Bausch and Lomb 250 mm.-grating monochromator, this coating gave reflection density of 1.0 at exposure times of 17–25 seconds over the spectral range of 3900 A. to 4700 A., while the 2-[4(p-dimethylaminophenyl) - 1,3 - butadienyl]quinoline alone required 19–30 seconds over the same spectral range, and the carbinol base alone required 90–110 seconds for the same density over the same spectral range.

EXAMPLE 9

Twelve and one-half milligrams of 4-(p-dimethylaminostyryl)quinoline, 25 mg. of 2-[1-cyano-3(3-ethyl-2(3H)-benzoxazolylidene)-propenyl]quinoline (structure (a) below) and 10 mg. of leuco-Crystal Violet (a)
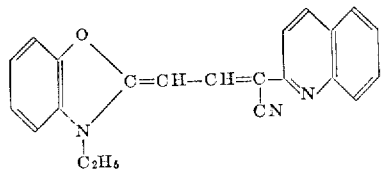

were mixed with 8 cc. of a one-percent solution of ethyl cellulose in toluene containing 1.4 grams of carbon tetrabromide. The mixture was coated on polyvinyl chloride film. Excellent print-out images were obtained through a negative on two to four seconds-exposure to a sunlamp. When the leuco-Crystal Violet was omitted from this formulation, ten second-exposure was required for the same image density.

EXAMPLE 10

Fifty milligrams of the azacyanine dye base, having the structure (b) below and the chemical name, (b)
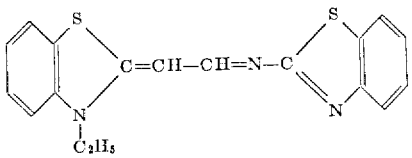

2-[(3-ethyl - 2(3H)-benzothiazolylidene)-ethylidene]aminobenzothiazole, and 25 mg. of leuco-Crystal Violet were mixed with a solution of 2.8 grams of carbon tetrabromide in 16 ml. of a solution of 1% ethyl cellulose in toluene. The mixture was coated on white Vinylite film and exposed under a negative to the light from a photoflood lamp. A fully exposed print was obtained in ten seconds of a neutral gray-black color. A similar mixture from which the leuco-Crystal Violet was omitted gave a much weaker image of approximately one-fifth the density, indicative of a fivefold increase in speed, using the synergistic mixture.

In the claims which follow the expression lower alkyl is intended to cover straight and branched chain unsubstituted (saturated) alkyls with up to four carbons in the chain, namely methyl, ethyl, n-propyl, and isopropyl.

Having now described our invention in accordance with the patent statutes, we claim:

1. A non-silver photosensitive composition which prints out directly as a result of exposure to visible light comprising a mixture of the following:

(a) Photolytically active organic halogen-containing compounds represented by the general formula A—C—Br₃ wherein A is selected from the group consisting of H, Cl, Br, I, alkyl, and aryl, (b) At least one member selected from the group consisting of styryl dye bases represented by general Formula I, (I)

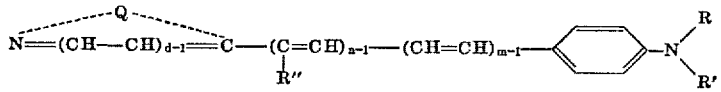

wherein R and R' each represents monovalent radicals selected from the group consisting of lower alkyl and benzyl; R" represents a monovalent radical selected from the group consisting of H and —CN; $d$ and $n$ each represents a positive integer of from 1 to 2; $m$ is a positive integer not greater than 4; and the sum of $n-1$ and $m-1$ is not greater than 4; and Q represents the nonmetallic atoms selected from the group consisting of C, O, S, Se, N, necessary to complete a heterocyclic ring with not more than 6 atoms in the ring; cyanine dye bases represented by general Formulas II and III below, wherein (II) is

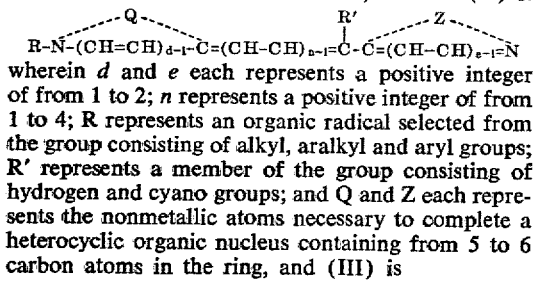

wherein $d$ and $e$ each represents a positive integer of from 1 to 2; $n$ represents a positive integer of from 1 to 4; R represents an organic radical selected from the group consisting of alkyl, aralkyl and aryl groups; R' represents a member of the group consisting of hydrogen and cyano groups; and Q and Z each represents the nonmetallic atoms necessary to complete a heterocyclic organic nucleus containing from 5 to 6 carbon atoms in the ring, and (III) is

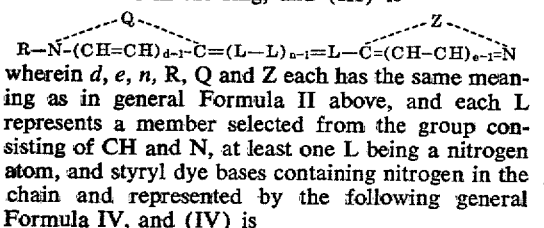

wherein $d$, $e$, $n$, R, Q and Z each has the same meaning as in general Formula II above, and each L represents a member selected from the group consisting of CH and N, at least one L being a nitrogen atom, and styryl dye bases containing nitrogen in the chain and represented by the following general Formula IV, and (IV) is

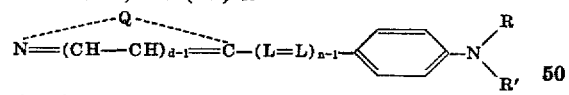

wherein R and R' have the same meaning as in Formula I, $d$ represents a positive integer from 1 to 2; $n$ represents a positive integer from 1 to 4, L represents a member selected from the group consisting of CH and N, at least one L being a nitrogen atom, and Q has the same meaning as in Formulas I, II and III, and mixtures thereof;

(c) At least one base of an aryl methane dye selected from the group consisting of leuco bases and carbinol bases of di- and tri-phenylmethane dyes, represented by general formula

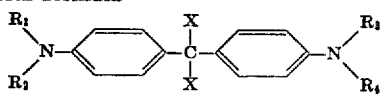

wherein R₁, R₂, R₃ and R₄ are each selected from the group consisting of H, alkyl, aralkyl and aryl groups; X is selected from the group consisting of —H and —OH and Y is selected from the group consisting of —H, phenyl, and

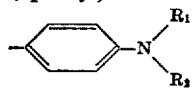

where R₁ and R₂ have the same meaning as before.

2. The composition of claim 1 dispersed in a clear, transparent solid film-forming plastic.

3. The composition of claim 2 as a self-supporting film.

4. A photosensitive article comprising the composition of claim 2 as a coating on a solid supporting substrate.

5. The composition of claim 1 wherein the organic halogen-containing compound is CBr₄.

6. The composition of claim 1 wherein the organic halogen-containing compound is CBr₄, the dye base is 4-(4-p-dimethylaminostyryl)quinoline and the leuco base is leuco-Crystal Violet.

7. The composition of claim 1 wherein the relative proportions of the photolytically active organic halogen-containing compound, dye base and base of an aryl methane dye selected from the group consisting of leuco bases and carbinol bases of di- and tri-phenylmethane dyes are between about 0.001 and about 0.01 part by weight each of dye base and of base of an aryl methane dye selected from the group consisting of leuco bases and carbinol bases of di- and tri-phenylmethane dyes for each part by weight of organic halogen-containing compound.

8. A process for producing colored photographic prints which comprises preparing the composition of claim 1; coating a solid supporting surface therewith, exposing the composition to a colored subject, thereby producing a negative image in color complementary to the colored subject.

9. The process of claim 8 wherein the image is intensified by heating for between 1 and 10 seconds after exposure.

10. The process of claim 8 wherein the developed print is treated with a solvent to wash away the undecomposed dye base.

11. The process of claim 8 wherein a multilayer pack is prepared and a full color negative image complementary in color to the colored subject, is obtained.

12. A process for producing a full color positive image where a color negative produced by the process of claim 11 is printed onto another sheet of the same material.

13. The process of claim 8 wherein the permanence and brilliance of the color image produced is enhanced by treating the image with a metal salt solution to form a lake.

14. The process of claim 8 wherein the substrate is paper and after the colored image is produced, washing the developed image with water, drying the washed sheet, re-exposing the same with a blanket exposure, thereby producing a positive image of the subject.

15. A process for producing a litho master, comprising preparing the composition of claim 1; coating a casein-filled paper therewith; exposing the composition to light through a suitable negative, thereby producing a positive image in color; swabbing the exposed sheet with water to render the background ink-repellent, the image area then being ink-receptive.

References Cited in the file of this patent

UNITED STATES PATENTS

| | | |
|---|---|---|
| 2,325,038 | Chalkley | July 27, 1943 |
| 2,702,242 | Neugebauer et al. | Feb. 15, 1955 |
| 2,835,576 | Ensink | May 20, 1958 |
| 2,855,303 | Chalkley | Oct. 7, 1958 |
| 2,855,304 | Chalkley | Oct. 7, 1958 |
| 3,033,677 | Abbott et al. | May 8, 1962 |
| 3,046,125 | Wainer | July 24, 1962 |

FOREIGN PATENTS

| | | |
|---|---|---|
| 209,993 | Germany | May 14, 1909 |
| 51,706 | France | Jan. 11, 1943 |

UNITED STATES PATENT OFFICE
CERTIFICATE OF CORRECTION

Patent No. 3,102,810            September 3, 1963

Robert H. Sprague et al.

It is hereby certified that error appears in the above numbered patent requiring correction and that the said Letters Patent should read as corrected below.

Column 2, line 43, for "no" read -- not --; column 7, lines 5 to 7, for that portion of the formula reading $$L-L' \quad \text{read} \quad L=L'$$

column 13, lines 63 to 65, for that portion of the formula reading $$\begin{array}{c} X \\ | \\ -C- \\ | \\ X \end{array} \quad \text{read} \quad \begin{array}{c} X \\ | \\ -C- \\ | \\ Y \end{array}$$

column 14, line 75, after "France" insert -- Addition --.

Signed and sealed this 3rd day of March 1964.

(SEAL)
Attest:
ERNEST W. SWIDER
Attesting Officer

EDWIN L. REYNOLDS
Acting Commissioner of Patents